United States Patent [19]
Kaniwa et al.

[11] Patent Number: 5,463,505
[45] Date of Patent: Oct. 31, 1995

[54] HELICAL-SCAN INFORMATION RECORDING-PLAYBACK APPARATUS

[75] Inventors: Kouji Kaniwa; Hideo Nishijima; Kouji Fujita, all of Katsuta; Keizo Nishimura, Yokosuka, all of Japan

[73] Assignee: Hitachi, Ltd., Tokyo, Japan

[21] Appl. No.: 538,655

[22] Filed: Jun. 15, 1990

[30] Foreign Application Priority Data

Jun. 16, 1989 [JP] Japan .................................. 1-152313

[51] Int. Cl.⁶ .......................... G11B 15/46; G11B 15/12
[52] U.S. Cl. ...................... 360/73.04; 360/61; 360/14.2; 360/31
[58] Field of Search .................................. 360/10.3, 10.1, 360/10.2, 19.1, 9.1, 72.02, 73.03, 73.04, 73.08, 64.61, 31, 58.1, 64, 66, 73.13, 14.2; 358/311, 319–321, 343

[56] References Cited

U.S. PATENT DOCUMENTS

| | | | |
|---|---|---|---|
| 4,390,906 | 6/1983 | Furumoto et al. | 360/19.1 |
| 4,484,237 | 11/1984 | Muto | 360/65 |
| 4,550,349 | 10/1985 | Okuyama et al. | 360/73.06 |
| 4,628,373 | 12/1986 | Takahashi et al. | 360/64 |
| 4,764,816 | 8/1988 | Heitmann | 360/31 |
| 4,764,822 | 8/1988 | Taniguchi et al. | 360/48 |
| 4,800,447 | 1/1989 | Toba | 360/10.3 |
| 4,890,169 | 12/1989 | Kobayashi et al. | 360/10.3 |
| 5,016,119 | 5/1991 | Ogawa et al. | 360/10.3 |
| 5,050,012 | 9/1991 | Nishiumi et al. | 360/6 C |
| 5,091,899 | 2/1992 | Adachi et al. | 360/14.3 X |

*Primary Examiner*—W. R. Young
*Assistant Examiner*—Varsha A. Kapadia
*Attorney, Agent, or Firm*—Antonelli, Terry, Stout & Kraus

[57] ABSTRACT

An information recording-playback apparatus is made up of a circuit for recording first information, which is video data or data for the evaluation of a recording medium such as a magnetic tape, on the first track formed by helical scanning of rotary heads, a circuit for recording second information such as a control signal or time code or third information on a second or third track formed by one or more fixed heads in the longitudinal direction of the tape, and switching device for selecting the operational mode in which the first information and the second or third information are recorded or the operational mode in which only the second or third information is recorded. The arrangement enables pre-formatting of only the second or third information without recording the tape evaluation information.

33 Claims, 12 Drawing Sheets

TAPE RUNNING DIRECTION

NOTE) VALUES IN PARENTHESES APPLIED TO 4-FOLD SPEED PRE-FORMATTING

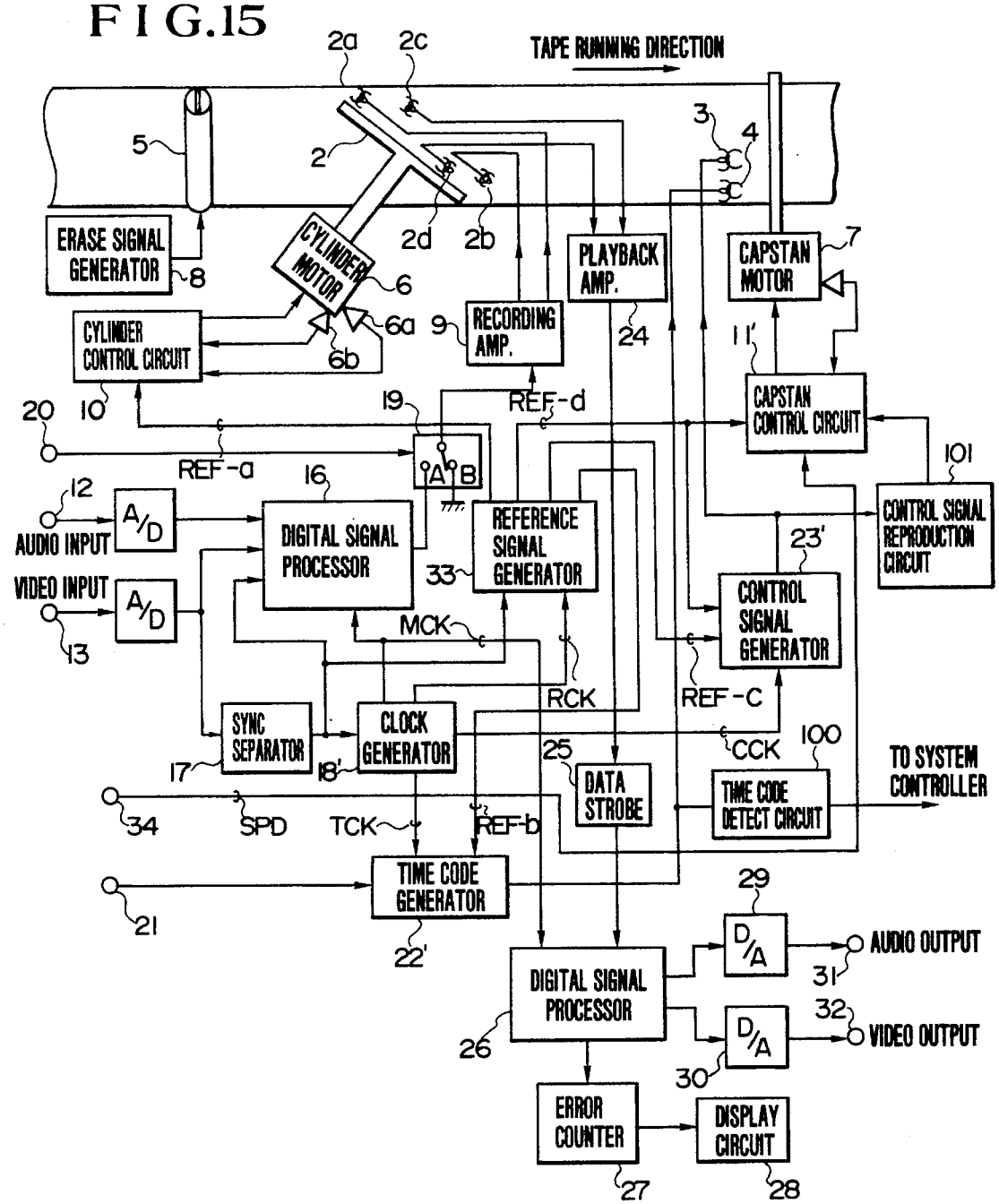

HELICAL-SCAN INFORMATION RECORDING-PLAYBACK APPARATUS

BACKGROUND OF THE INVENTION

This invention relates to a helical-scan information recording-playback apparatus, and particularly to an information recording-playback apparatus having a function of pre-recording a control signal or time code signal on a certain track in the longitudinal direction of the tape.

Video tape recorders (VTRs) based on the digital signal processing are superior to conventional VTRs based on the analog signal processing in the picture quality, dubbing function and usage. On this account, VTRs, particularly business-oriented VTRs, are now in the transition to digital models. The digital VTRs are standardized, for example, as the D-2 format composite digital VTR described in Proposed American National Standard, V16.83, Apr. 1, 1988, pp. 1–10; V16.87-441Apr. 1, 1988, pp. 1–40; and V16.88-422, Apr. 1, 1988, pp. 1–3.

The digital VTRs are designed to pre-record the time code and control signal on a longitudinal track of the tape, and have the pre-formatting function for the tape evaluation or assessment, with the intention of enhanced usage at editing.

The following explains the pre-formatting with reference to FIGS. 1 and 2. FIG. 1 shows the arrangement of rotary heads for helical scanning, in which indicated by 2 is a cylinder, 2a and 2b are recording heads, and 2c and 2d are playback heads. FIG. 2 shows a tape pattern created by pre-formatting a magnetic tape, in which indicated by 1 is a magnetic tape, 2a and 2b are recording magnetic heads, 2c and 2d are playback magnetic heads, 3 and 3T are a control signal head and a control signal track, respectively, and 4 and 4T are a time code head and a time code track, respectively.

Pre-formatting is to record the passing of time since the tape head in "hour", "minutes" and "seconds" and a video frame number ranging from 0 to 29 on the time code track 4T, and to record a reference signal for the rotational phase of the capstan, i.e., a control signal which provides the reference for tracking control. The recorded time code facilitates editing such as "insert". For tape evaluation, some video signal, e.g., black burst signal, converted into a digital signal is recorded with the rotary heads 2a and 2b, separately from the time code and control signal, so that it is subsequently reproduced with the playback heads 2c and 2d shown in FIG. 1 thereby to detect errors in the reproduced digital signal, with the intention of warning the user of the use of the tape having much errors that are hindrance to have satisfactory picture and sound qualities, with a view to enhance the recording reliability.

SUMMARY OF THE INVENTION

However, it was found that the following problems emerged when a tape pre-formatted in the conventional manner as mentioned above was used for recording.

FIG. 3 shows a tape pattern on a pre-formatted tape during the recording. In the Figure, inclined tracks shown by the dashed lines are for a signal, e.g., black burst signal, recorded for the tape check at pre-formatting, and inclined tracks shown by the solid lines are for the video and audio signals that are being recorded currently. A hatched portion A is an area which has not been recorded due to a momentary obstruction such as gap clogging of the recording head 2a or 2b. The area A will have a residual record of the black burst signal or the like for the tape check. Accordingly, when a tape including such an area as A is played back, the reproduced signal from the area A is detected to be correct information because of it being the black burst signal for the tape check, whereas digital information of an usual dropout portion is detected to be error and rendered error correction so that most or complete recorded information can be reproduced. Consequently, no corrective or interpolation process is conducted for the area A, and it appears as a black noise in the reproduced video signal. This problem cannot be overcome completely through the provision of a flying erasure head for the track-wise erasing operation because of a possible obstruction such as gap clogging of the flying erasure head.

Moreover, the conventional pre-formatting, although it enables the tape check, takes as long time as normal recording even for recording only the time code and/or control signal, resulting in degraded usage.

Accordingly, an object of this invention is to provide an information recording-playback apparatus having a pre-formatting function in which pre-formatting does not adversely affect the subsequent recording and playback operations.

Another object of this invention is to provide an information recording-playback apparatus which has a useful pre-formatting function by which pre-formatting is conducted in a shorter time than the normal recording time and therefore is easy to use.

In order to achieve the first-mentioned object based on one aspect of this invention, the system is provided with an operating mode in which at least one of the time code or control signal is recorded at pre-formatting, without recording the tape check signal.

In order to achieve the first-mentioned object based on another aspect of this invention, as a tape check signal to be recorded at pre-formatting, such a tape check signal is recorded that the error detection and correction abilities in the tape check playback mode are comparable to those of the normal recording-playback mode, and reproduction of the tape check signal in the normal playback mode results entirely in the detection of error.

In order to achieve the other object based on another aspect of this invention, the apparatus is provided with a means of making the capstan motor speed in pre-formatting N times that of normal recording, and a means of making the period of the time code and/or control signal in pre-formatting 1/N time that of normal recording.

By the provision of the pre-formatting mode which does not record the tape check signal, the time code and control signal can be recorded without any adverse influence on the subsequent recording-playback operation.

By recording such tape check signal at preformatting that it is detected to be error in case of reproduction during the normal playback mode, even if the tape check signal remains at a defect of record created in the subsequent recording, the tape check signal is treated as error in the playback mode and it does not disturb the reproduced video and audio information.

The N-fold speed-up means for the capstan motor increases the tape speed by N times and the 1/N fold period reduction means for the time code and/or control signal increases the frequency of these signals by N, allowing the recorded time code and control signal to have the same format as of pre-formatting at the normal speed, whereby the time expended for preformatting can be reduced to 1/N.

BRIEF DESCRIPTION OF THE DRAWINGS

FIG. 15 is a block diagram showing the information recording-playback apparatus having the fast pre-formatting function according to another embodiment of this invention.

DESCRIPTION OF THE PREFERRED EMBODIMENTS

The first embodiment of this invention will be described with reference to FIG. 4, which is a block diagram of the information recording-playback apparatus having the pre-formatting mode which records only the time code and control signal, without recording the tape check signal.

In the figure, indicated by 1 is a magnetic tape, 2 is a cylinder, 2a and 2b are magnetic heads, 2c and 2d are playback heads, 3 is a head for the control signal, 4 is a head for the time code, 5 is a head for full erasure, 6 is a cylinder motor, 7 is a capstan motor, 8 is an erasing signal generator, 9 is a recording amplifier, 10 is a cylinder control circuit, 11 is a capstan control circuit, 12 and 13 are input terminals for the audio and video signals, 14 and 15 are A/D converters, 16 is a digital signal processor, 17 is a sync signal separation circuit, 18 is a clock generation circuit, 19 is a switch, 20 is an input terminal for the control signal, 21 is an input terminal for the preset signal for the time code, 22 is a time code generator, 23 is a control signal generation circuit, 24 is a playback amplifier, 25 is a data strobe circuit, 26 is a digital signal processor, 27 is an error counter, 28 is a display circuit, 29 and 30 are D/A converters, 31 and 32 are output terminals for the audio and video signals, 100 is a time code detection circuit, and 101 is a control signal reproduction circuit. The cylinder 2 and heads 2a–2d constitute a rotary head assembly.

First, pre-formatting for recording and reproducing the tape check signal will be explained. It is assumed in this embodiment that the black burst is used as the input video signal for the tape check.

Figure 4:
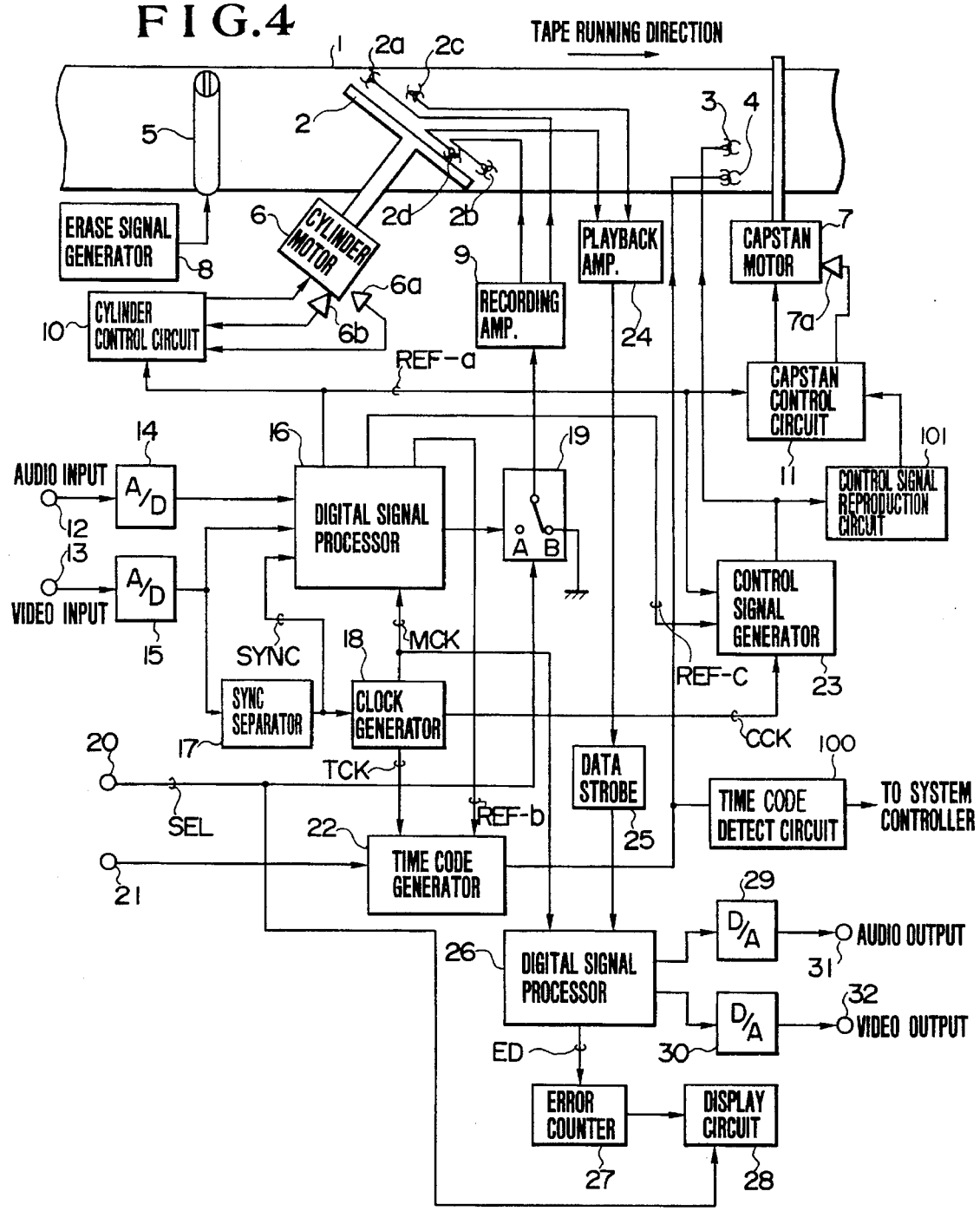
FIG. 4 is a block diagram showing the information recording-playback apparatus having the pre-formatting function based on an embodiment of this invention.

In FIG. 4, the black burst signal entered through the input terminal 13 is converted into a digital signal by the A/D converter 15 and it is delivered to the digital signal processor 16 and sync signal separation circuit 17. The reason for the need of some video signal at pre-formatting is to use the sync signal in the video signal for the reference signal of the system clock and for the reference signal for the cylinder and capstan control systems. The audio input signal is not required for pre-formatting. The sync signal SYNC of the input video signal separated by the sync signal separation circuit 17 is delivered to the digital signal processor 16 and clock generation circuit 18. The clock generation circuit 18 generates a master clock MCK for digital signal processing, a clock TCK for time code generation, and a clock CCK for control signal generation based on the sync signal SYNC, and supplies these clock signals to the digital signal processors 16 and 26, time code generation circuit 18 and control signal generation circuit 23. The digital signal processor 16 of the recording system operates by being timed to the sync signal SYNC to shuffle and divide into blocks the digital signals provided by the A/D converters 14 and 15 by using the master clock MCK, adds an error detection-correction code, such as Reed Solomon, to the digital signal, and delivers it to the input terminal A of the switch 19. The digital signal processor 16 also operates by being timed to the sync signal SYNC to generate a reference signal REF-a which determines the rotational phase of the cylinder motor 6 (cylinder) and capstan motor 7 (capstan), a reference signal REF-b which determines the timing of time code generation, and a reference signal REF-c which determines the timing of control signal generation, and delivers these signals to the cylinder control circuit 10 and capstan control circuit 11, the time code generation circuit 22, and the control signal generation circuit 23, respectively.

The time code generation circuit 22 presets the time code in accordance with the time code initialization data supplied through the input terminal 21 at or before the commencement of pre-formatting, and after the pre-formatting has started it generates time codes sequentially at an interval of the reference signal REF-b in response to the clock TCK, and records the time codes on the magnetic tape 1 by means of the time code head 4. The control signal generation circuit 23 bases its operation on the reference signal REF-a and REF-c to produce at a certain timing a control signal having a certain pulse width by counting the clock CCK, and to record the control signal on the magnetic tape 1 by means of the control signal head 3.

The cylinder control circuit 10 includes a speed control system which negative-feeds back to the cylinder motor 6 the difference between the period of the frequency generator (FG) signal having a frequency proportional to the rotational speed of the cylinder motor 6 detected by an FG sensor 6a and a predetermined target period, and a phase control system which negative-feeds back to the cylinder motor 6 the difference between the rotational phase signal of the cylinder motor 6 detected by a rotational phase detection sensor 6b and the reference signal REF-a, thereby driving the cylinder motor 6 so as to rotate at the specified speed and specified phase.

The capstan control circuit 11 includes a speed control system which negative-feeds back to the capstan motor 7 the difference between the period of the FG signal having a frequency proportional to the rotational speed of the capstan motor 7 detected by the FG sensor 7a and a predetermined target period, and a phase control system which negative-feeds back to the capstan motor 7 the difference between the phase of the frequency-divided signal of the capstan FG signal and the reference signal REF-a, thereby driving the capstan motor 7 to rotate at the specified speed.

The digital record signal delivered to the input terminal A of the switch 19 from the digital signal processor 16 is fed to the recording amplifier 9 by way of the switch 19. The switch 19 has its selecting contact closed to terminal A or terminal B in response to the control signal SEL entered through the input terminal 20. The input terminal A is selected in the case of recording the tape check signal, or the input terminal B is selected in the case of recording only the time code and control signal.

The digital record signal supplied to the recording amplifier 9 is amplified to the proper level of magnetic recording, and it is recorded on the magnetic tape 1 by means of the recording head 2a or 2b.

Figure 2:
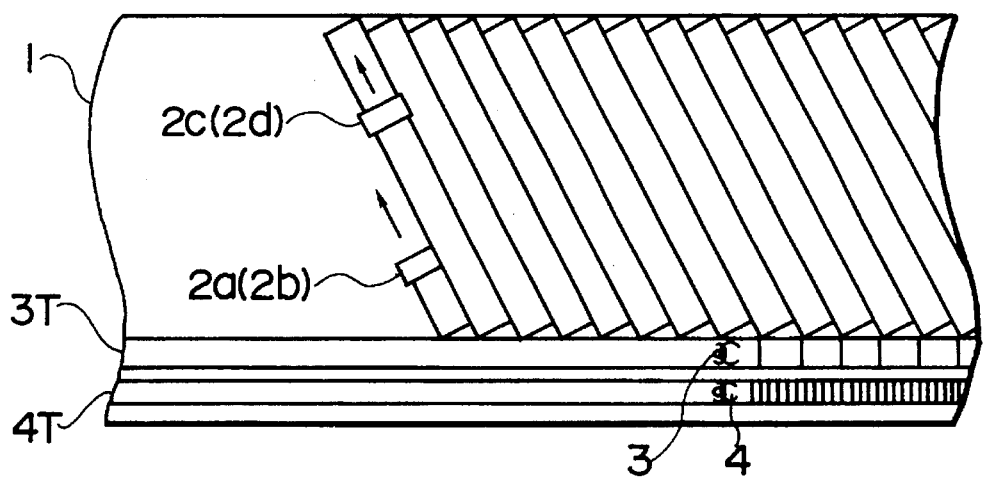
FIG. 2 is a diagram showing a tape pattern at pre-formatting.
Figure 3:
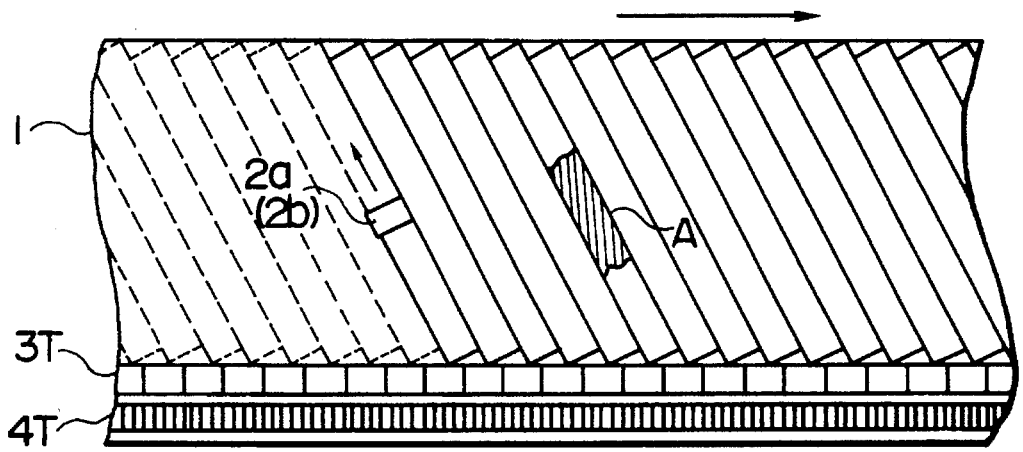
FIG. 3 is a diagram showing a tape pattern during information recording on a pre-formatted tape.

The digital signal which has been recorded as described above is reproduced by the following playback head 2c or 2d, and delivered to the playback amplifier 24, as shown in FIG. 2. After being amplified by the playback amplifier 24, the digital playback signal is subjected to clock extraction by the data strobe circuit 25. The digital playback signal is subjected to discrimination between "0" and "1" in response to the detected clock signal, and the resulting logical signal is delivered to the digital signal processor 26 of the playback system. The digital signal processor 26 performs block-by-block error detection, correction and deshuffling for the digital playback signal supplied from the digital strobe circuit 25 thereby to restore it to the original signal as recorded, and delivers the audio data to the D/A converter 29 and the video data to the D/A converter 30. In case error is detected in the playback data, an error detect signal ED is sent to the error counter 27. The error counter 27 responds to the error detect signal ED to accumulate the number of errors in unit time length as the error rate and also counts the number of events of error counts exceeding the prescribed value, and sends these values to the display circuit 28. The display circuit 28 displays the error rate according to the error information and also displays the tape quality evaluated from the error rate.

The D/A converters 29 and 30 which receive the audio and video playback data from the digital signal processor 26 operate to convert these playback data into an analog audio signal and analog video signal, and deliver these signals through the output terminals 31 and 32. In the pre-formatting mode however, these reproduced analog signals do not always need to be outputted because it is not the purpose of the pre-formatting mode to output such. The erasing signal generation circuit 8 supplies the erasing signal to the erasing head 5 at pre-formatting so that the tape is pre-formatted following the tape erasure.

The tape speed control in playback mode is performed the capstan control circuit 11 which controls the rotational speed and phase of the capstan. The speed control to have a constant tape speed is implemented in the same manner as in the foregoing recording mode. The rotational phase control is based on the comparison between the reference signal produced from the REF-a signal and the reproduced control signal provided by the control signal reproducing circuit 101.

The time code detection circuit 100 detects the time code in the playback signal from the time code head 4 and delivers it to the system controller (not shown), which recognizes the positions on the tape based on the supplied time code.

These are the operation of the case of preformatting in which the tape check signal is recorded and reproduced. Next, the case of pre-formatting in which the tape check signal is not recorded will be explained.

In FIG. 4, the pre-formatting without recording the tape check signal differs from the above explanation in the portions of the switch 19 and display circuit 28. In the pre-formatting mode without recording the tape check signal, the switch 19 is positioned to the input terminal B in response to the control signal SEL entered through the input terminal 20. Accordingly, the recording heads 2a and 2b do not receive the record signal, and the tape check signal is not recorded on the magnetic tape 1. Even in the mode without recording the tape check signal, the erasing signal generation circuit 8 and erasing head 5 are active, as explained previously, causing the magnetic tape 1 to be erased to become the blank state prior to the recording of the time code and control signal. On this account, only the time code and control signal are recorded at the end of pre-formatting, with the recording area (helical scan area) for the magnetic heads 2a and 2b being brought to the black state.

In the pre-formatting mode without recording the tape check signal, the following playback heads 2c and 2d produce only noises, causing the digital signal processor 26 to indicate error in its entire error detection for the playback signal. Therefore, in this pre-formatting mode, the display circuit 28 responds to the control signal SEL from the input terminal 20 to mask the error rate information provided by the error counter 27 and indicates on the display that this is the pre-formatting mode without recording the tape check signal.

As described above, this embodiment is operative for pre-formatting selectively in two modes, one in which the tape check signal is recorded, the other not, through the control of the switch 19 and display circuit 28 in response to the control signal SEL received on the input terminal 20. Accordingly, this apparatus allows the user to choose the conventional pre-formatting mode in which the time code and control signal are recorded while implementing the tape evaluation, and the pre-formatting mode in which the tape check signal is not recorded, so that no adverse influence is imposed on the subsequent recording or playback, and only the time code and control signal are recorded. In addition, the requirement of both tape evaluation and avoidance of the adverse influence on the recording and playback operations after the pre-formatting can be accomplished by running the system in the pre-formatting mode in which the tape check signal is recorded and reproduced, and thereafter in the pre-formatting mode without recording the tape check signal.

Although in the foregoing embodiment both of the control signal and time code are recorded on the tape, the present invention is of course applicable to the case in which only one of the control signal and time code is recorded. Moreover, the present invention is not confined to the recording system in which a track dedicated to the control signal is formed on the tape, but it is also applicable to the case where systems, such as the 8-mm VTR, in which a pilot signal that is frequency-multiplexed on the video signal is used to control the capstan for tracking in the playback mode, are arranged to record information, such as a time code, on a longitudinal track of the tape.

Next, the second embodiment of this invention will be described with reference to FIG. 5. This embodiment, different from the preceding first embodiment in which the tape check signal is recorded or not under control, is intended to provide the pre-formatting tape check signal with a form different from that of the digital signal dealt with in the normal recording and playback so that even if a residual tape check signal exists when the tape is recorded after the pre-formatting, it is treated as error and does not behave adversely in the playback operation.

Figure 5:
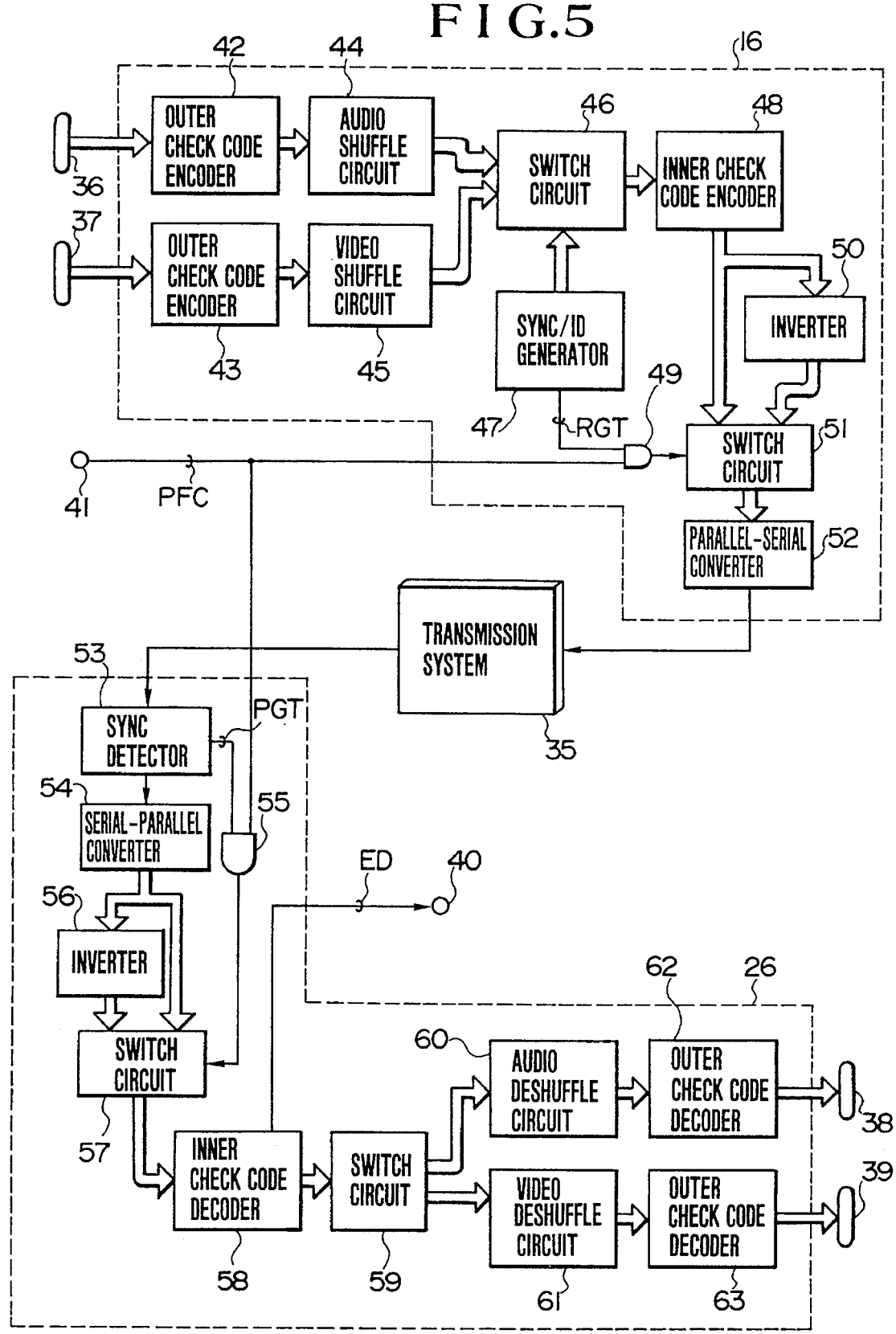
FIG. 5 is a block diagram showing the digital signal processing section based on another embodiment of this invention.

FIG. 5 is a block diagram showing the principal portions of the digital signal processors 16 and 26 shown in FIG. 4. A section enclosed by the dashed line 16 is the digital signal processor 16 of the recording system, and another section enclosed by the dashed line 26 is the digital signal processor 26 of the playback system. Indicated by 36 and 37 are input terminals for the digital audio signal and digital video signal of the recording system supplied from the respective A/D converters, and 38 and 39 are output terminals for the digital audio signal and digital video signal of the playback system delivered to the respective D/A converters. 40 is an output terminal for the error detect signal ED to be delivered to the error counter 27, and 41 is an input terminal for the control signal PFC indicative of the pre-formatting mode. Indicated by 35 represents a digital information transmission system existing between the digital signal processor 16 of the recording system and the digital signal processor 26 of the playback system. The digital information transmission system may be one similar to the one shown in FIG. 4.

The following explains the digital signal processors 16 and 26. In FIG. 5, the digital audio signal and digital video signal entered through the input terminals 36 and 37 are delivered to outer check code encoders 42 and 43, respectively. The outer check code encoders 42 and 43, in the case of a D-2 composite digital VTR for example, form the input digital signal into 85-byte blocks, with error correction parity data (outer check codes) being appended thereto.

Figure 6:
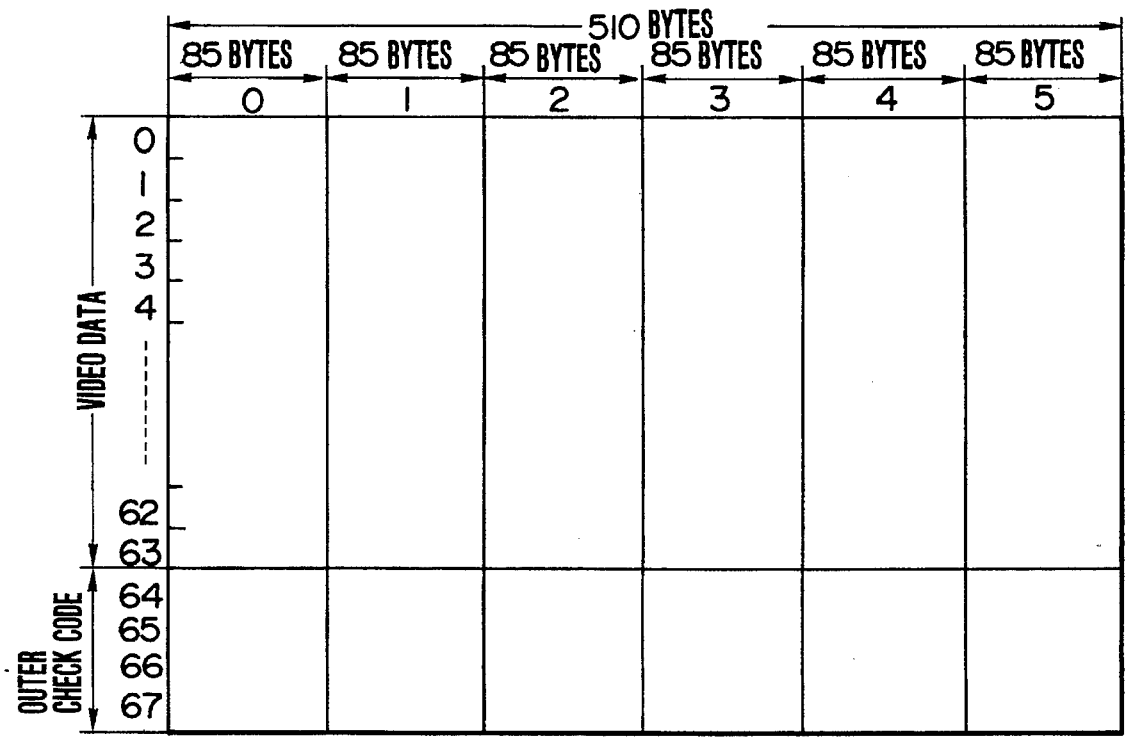
FIG. 6 is a diagram showing the arrangement of data blocks recorded on one track.

FIG. 6 shows an example of the data structure of the digital video signal provided with the outer check code. The figure shows the block structure of the video data and outer check code recorded on one of tracks formed by helical scanning. In the figure, the video data formed in 85-byte blocks is arranged in 64 rows by 6 columns, with a 4-byte error correction outer check code being appended to each 64-byte column of data blocks.

The audio and video data, with the outer check codes being appended thereto by the outer check code encoders 42 and 43, are passed to an audio shuffle circuit 44 and video shuffle circuit 45, by which the data sequence is shuffled in block units in accordance with a prescribed rule and then the resulting data are delivered to a switch circuit 46. The switch circuit 46 forms the audio and video data supplied from the shuffle circuits into 2-block units (85 bytes×2), appends the sync signal and ID signal provided by a SYNC/ID generation circuit 47 to each unit, and delivers the resulting data to an inner check code encoder 48 in the order of recording. The ID signal is the address used in the case of playback for restoring the original arrangement of the data which has been shuffled by the preceding shuffle circuit. In the block arrangement shown in FIG. 6, each unit data consists of 2 by 85 bytes, and therefore the number of unit data is 68×(6/2)=204 and the ID signal address ranges from 0 to 203. The inner check code encoder 48 appends the error detection-correction code (inner check code) to the ID data and the audio and video data supplied from the switch circuit 46, and delivers the resulting data to an inverting circuit 50 and switch circuit 51.

Figure 7:
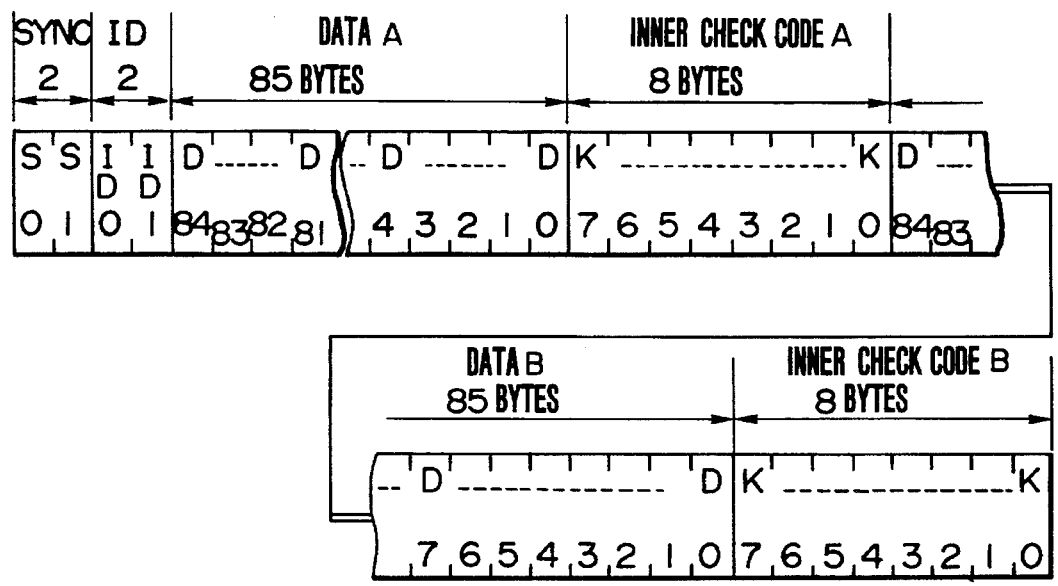
FIG. 7 is a diagram showing the data format of the data block.

FIG. 7 shows an example of the data format of the output data of the inner check code encoder 48. In the figure, SYNC is a sync signal for the data block, ID is ID data containing address information, etc. of the block, inner check code A is an error detection-correction code generated through a prescribed computation on the ID data and data A, and inner check code B is an error detection-correction code generated through a prescribed computation on the data B. The inverting circuit 50 inverts the output data of the inner check code encoder 48 and delivers the result to the switch circuit 51. The switch circuit 51 selects the output data of the inner check code encoder 48 or its inverted version in accordance with the output signal of an AND gate 49, and delivers the selected data to a parallel-serial conversion circuit 52, which converts the byte data into bit data and delivers it to the transmission system 35.

The foregoing digital signal processor 16 of the recording system based on this embodiment is characterized in the provision of the inverting circuit 50 and switch circuit 51 so that the output data of the inner check code encoder 48 or its inverted version is selected in accordance with the output signal of the AND gate 49. The following describes the operation related to this feature in the pre-formatting mode and normal recording mode.

In the normal recording mode, the control signal PFC applied to the input terminal 41 is low, causing the AND gate 49 to produce a low output invariably. The switch circuit 51 responds to the low output of the AND gate 49 to select the output data of the inner check code encoder 48, and delivers it to the parallel-serial conversion circuit 52. Accordingly, the record signal data has no change at all in this case. In the pre-formatting mode, the control signal PFC applied to the input terminal 41 is high, causing the AND gate 49 to produce an output in compliance with the output signal RGT of the SYNC/ID generation circuit 47. The switch circuit 51 responds to the high output of the AND gate 49 to select the output data of the inverting circuit 50, and delivers it to the parallel-serial conversion circuit 52. The control signal RGT supplied from the SYNC/ID generation circuit 47 has a high period for inverting a predetermined number of bytes of the output data of the switch circuit 47, in the case of the data format shown in FIG. 7, for example. The predetermined number of bytes is such that when the inner check code for error detection-correction has an error detecting ability of N bytes in principle, the number of bytes in need of inversion by the switch circuit 51 is N+1 or more. The SYNC/ID generation circuit 47 is designed to make the control signal RGT high in response to the generation of each of N+1 or more addresses prepared. On this account, the playback data derived from the record signal data at pre-formatting will all be detected as error unless it is rendered the inverting process for offsetting the above-mentioned inverting process. Accordingly, even if the tape check signal at pre-formatting remains after the subsequent recording operation, it includes inverted data in each block, and therefore it is entirely treated as error during the error detection process and no adverse influence will result.

Next, the operation of the digital signal processor 26 of the playback system will be explained. In FIG. 5, the playback data sent from the transmission system 35 is received by a SYNC detection circuit 53, by which the sync signal SYNC in the data block as shown in FIG. 7 is detected. The playback data is then passed to a serial-parallel conversion circuit 54, by which bit data is converted into byte data, and it is delivered to an inverting circuit 56 and switch circuit 57. The switch circuit 57 selects the output data of the serial-parallel conversion circuit 54 or the output data of the inverting circuit 56 in response to a low or high output signal of the AND gate 55, respectively, and delivers it to an inner check code decoder 58. The AND gate 55 provides the switch circuit 57 with the AND result of the control signal PFC applied to the input terminal 41 and the gate signal PGT sent from the SYNC detection circuit 53. The control signal PFC is low in the normal playback mode, or it is high in the pre-formatting mode. The gate signal PGT goes high at the timing of reproduction of the data which has been switched to the inverted signal by the switch circuit 51 in the digital signal processor 16 of the recording system. Accordingly, the switch circuit 57 delivers the output data of the serial-parallel conversion circuit 54 intact to the inner check code decoder 58 in the normal playback mode, or it delivers the output data of the inverting circuit 56 only during the period in which data which has been inverted at recording is reproduced in the pre-formatting mode. Consequently, in the case of normal recording and normal playback or in the case of pre-format recording and pre-format playback, the output data of the inner check code encoder 48 of the recording system is supplied to the inner check code decoder 58, whereby error detection and correction are implemented correctly. In the case of pre-format recording and normal playback, certain data in each block unit of playback data are inverted, and all blocks are treated as error in the error detection process by the inner check code decoder 58. On this account, even if the tape check signal of pre-formatting is left as it is at recording after the pre-formatting, it does not adversely affect the playback signal.

The inner check code decoder 58 implements error detection for the supplied playback data. In response to the error detection, the decoder 58 sends the error detect signal ED by way of an output terminal 40 to the error counter 27 shown in FIG. 1, and it performs error correction for a recoverable error and delivers the result to the switch circuit 59. The switch circuit 59 extracts the audio data and video data from the playback data, and delivers these data to an audio deshuffle circuit 60 and video deshuffle circuit 61, respectively. The audio deshuffle circuit 60 and video deshuffle circuit 61 restore the original block arrangement of the supplied audio and video data in accordance with the ID signal which possesses the address information appended at recording, and deliver the resulting data to outer check code decoders 62 and 63. These decoders correct errors which have been created during the recording and playback operations using the outer check code, or implement such processing as interpolation for data that are not correctable, and deliver the playback audio data to the D/A converter 29 by way of the output terminal 38 and the playback video data to the D/A converter 30 by way of the output terminal 39.

As described above, this embodiment enables the tape evaluation at pre-formatting by using a tape check signal of the same type in frequency band, modulation mode, etc. as in normal recording and playback. Moreover, even if the tape check signal is partly left as it is due to defective overwriting or the like at recording after the pre-formatting, it is processed as error invariably, whereby pre-formatting can be conducted without any adverse influence on the subsequent recording and playback operations.

Although in this embodiment data inversion at pre-formatting is implemented in the succeeding stage of inner check code encoder of the recording system and in the preceding stage of inner check code decoder of the playback system, this data inversion may be done in the succeeding stage of parallel-serial conversion circuit and the preceding stage of serial-parallel conversion circuit, without any degradation in the effectiveness of this embodiment.

Figure 8:
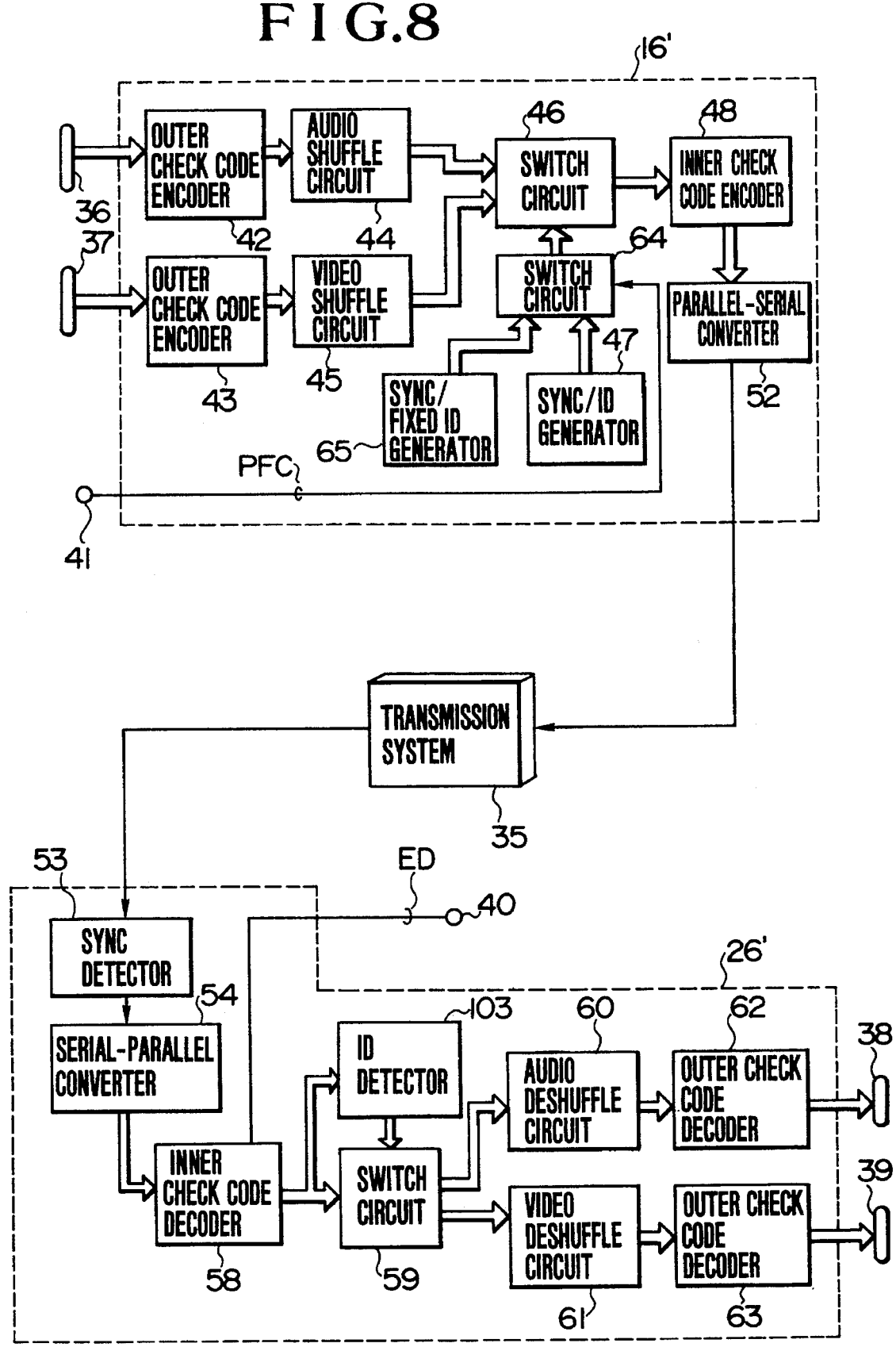
FIG. 8 is a block diagram showing the digital signal processing section based on another embodiment of this invention.

Next, the third embodiment of this invention will be described with reference to FIG. 8. The figure is a block diagram showing the principal portions of the digital signal processors 16' and 26' of the recording system and playback system, respectively, with functional blocks having the same operations as of those explained on FIG. 5 being referred to by the common symbols. In FIG. 8, the digital signal processor of the recording system has additional blocks of a switch circuit 64 which is controlled by the control signal PFC received on the input terminal 41 and a SYNC/fixed ID generation circuit 65. The digital signal processor of the playback system has an additional block of an ID detection circuit 103. The embodiment does not use the inverted version of specific data for the check signal at pre-formatting, and therefore the inverting circuits 50 and 56, switch circuits 51 and 57, and control signal AND gates 49 and 55 in FIG. 5 are eliminated.

The third embodiment differs from the second embodiment most significantly in the generation of the tape check signal at pre-formatting. In the second embodiment of the case with the tape check signal, the error detect data is appended and thereafter certain data in each block of data is inverted so as to remove the influence in the normal playback operation, whereas in the third embodiment, this purpose is accomplished by reforming the ID signal which is address data used in shuffling block data.

In the digital signal processor of the recording system in FIG. 8, functional blocks other than the switch circuit 64 and SYNC/fixed ID generator 65 operate identically to the arrangement of FIG. 5, and explanation will not be repeated.

In operation, first in the normal recording mode, the control signal PFC received on the input terminal 41 is low, and is delivered to the switch circuit 64. The switch circuit 64 selects the output data of the SYNC/fixed ID generator 65 in response to a high PFC signal, or selects the output data of the SYNC/ID generation circuit 47 in response to a low PFC signal, and delivers the data to the switch circuit 46. Accordingly, in the normal recording mode, the output data of the SYNC/ID generation circuit 47 (SYNC data and ID data) is supplied to the switch circuit 46. The ID data appended to the record data has the assignment of block addresses from 0 to 203, with each block being sized 2 by 85 bytes as explained previously for the second embodiment. The block address is used as a reference address of deshuffling at playback for restoring the original data arrangement.

Next, the operation in the pre-formatting mode will be described. In the pre-formatting mode, the control signal PFC is high, and accordingly the switch circuit 64 delivers the output data of the SYNC/fixed ID generator 65 to the switch circuit 46. The SYNC/fixed ID generator 65 operates identically to the SYNC/ID generation circuit 47 in generating the data block sync signal, but it differs in the generation of ID data, i.e., block address. The block address generated by the SYNC/fixed ID generator 65 is set to be outside the block address range 0–203 of normal recording, e.g., 255. The fixed ID data is appended to all data blocks by the switch circuit 46. Although in this embodiment a fixed address is assigned to a data block, it may not be a fixed address, provided that it is out of 0–203.

Next, the digital signal processor of the playback system will be described. The playback data reproduced by the transmission system 35 is delivered to the SYNC detection circuit 53, which detects the sync signal SYNC of each data block as shown in FIG. 7. The playback data whose sync signal is detected, is sent to the serial-parallel conversion circuit 54, by which bit data is converted into byte data, and thereafter it is delivered to the inner check code decoder 58. The inner check code decoder 58 implements error detection for the supplied playback data. In response to the error detection, it sends the error detect signal ED to the error counter 27 shown in FIG. 1 by way of the output terminal 40, or for a recoverable error it corrects the error and sends the ID signal to the ID detection circuit 103 and the video and audio data (including the outer check code) to the switch circuit 59. The video and audio data received by the switch circuit 59 are delivered to the video deshuffle circuit 61 and audio deshuffle circuit 60, respectively, in accordance with the address information of the ID signal detected by the ID detection circuit 103. The video deshuffle circuit 61 has a memory structure as shown in FIG. 6, for example, and it writes the playback data in 2 by 85 bytes blocks in accordance with the address information provided by the ID detection circuit 103. In the example of FIG. 6, where the memory capacity is 85 bytes×6×68 with a block made up of 2 by 85 bytes, the address has a range of 3×68, i.e., 0 to 203.

The system is designed such that before the playback data is stored in the memory of deshuffle circuit, its contents are treated as error unconditionally. In normal recording, the playback data is stored in the memory sequentially, and the memory contents are replaced with new correct data progressively. On the other hand, the check signal at pre-formatting has its address given outside of the range 0–203, and therefore the playback data is not stored in the memory and the entire deshuffled data are recognized to be error. The audio deshuffle circuit 60 operates similarly to the video deshuffle circuit 61 to generate error data for the check signal at pre-formatting.

The video and audio data which have been restored to the original arrangement by the deshuffle circuits are delivered to the outer check code decoders 63 and 62, respectively, by which error is corrected using the outer check code. The output data of the outer check code decoders 63 and 62 are fed to the D/A converters by way of the output terminals 39 and 38, and their outputs are delivered as the original analog video signal and analog audio signal.

As described above, if block address data, which is not defined in the normal recording mode, is added at pre-formatting, undefined address data will be detected at deshuffling of playback data, with block data having the appendage of undefined address data being processed as error data. Consequently, even if part of the tape check signal is left as it is due to defective overwriting or the like at recording after the pre-formatting, the block address reproduced from the residual check signal is an undefined one outside of 0–203, and therefore it is judged to be error and it does not adversely affect the playback video and audio information. Concerning the tape evaluation ability at pre-formatting, part of data is altered at the front stage of the error detection code generation/appendage (front stage of inner check code encoder), i.e., error detection data is generated for the altered data, and therefore the error detection ability is comparable to the case of the normal recording-playback mode.

Although in the embodiments of FIG. 5 and FIG. 8 the control signal and time code are recorded for pre-formatting, the present invention is obviously applicable to the case of recording only one of them. In addition, the present invention is not confined to the recording system having a specialized control signal track on the tape, but it is also applicable to the recording-playback apparatus, such as the 8-mm VTR, in which the playback capstan control is based on the pilot signal that is frequency-multiplexed with the video signal.

Figure 1:
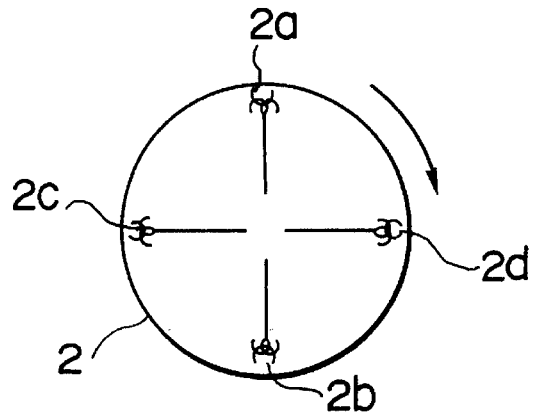
FIG. 1 is a diagram showing the arrangement of the rotary heads on the cylinder.
Figure 9:
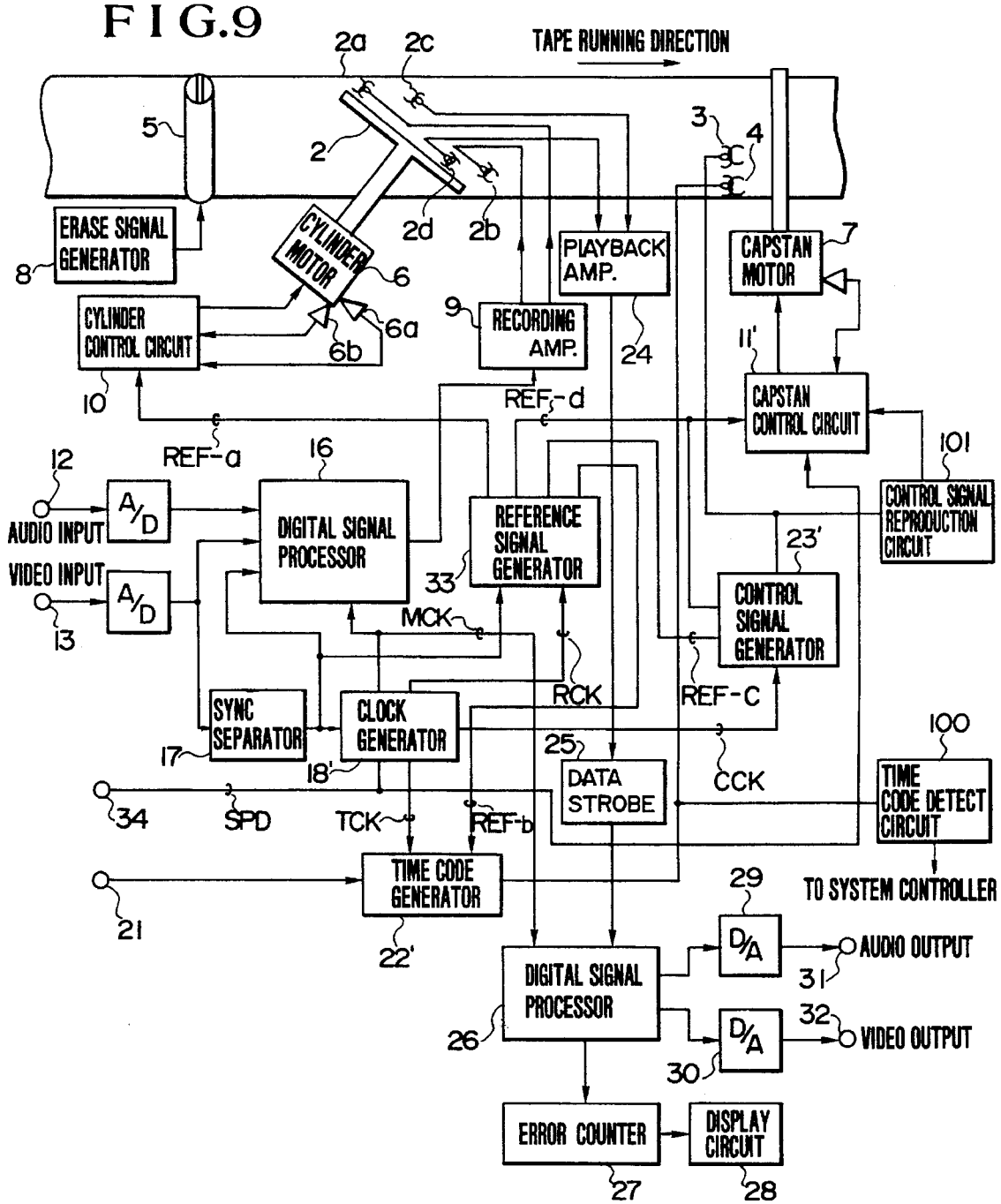
FIG. 9 is a block diagram showing the information recording-playback apparatus having the fast pre-formatting function based on this invention.

Next, the fourth embodiment of this invention will be described with reference to FIGS. 9 to 13. FIG. 9 is a block diagram of the information recording-playback apparatus having a fast pre-formatting function which takes less time than normal recording. In the figure, functional blocks operating identically to those explained on FIG. 1 are referred to by the common symbols. The pre-formatting of this embodiment is faster by four times than the conventional case.

In FIG. 9, differences from the arrangement of FIG. 4 for achieving the fast pre-formatting are the clock generation circuit 18', time code generation circuit 22', control signal generation circuit 23', reference signal generation circuit 33, and capstan control circuit 11'. The clock generator 18' and reference signal generator 33 are means of controlling or dictating the recording speed, as will be apparent from the following explanation.

In the normal pre-formatting mode, the clock generation circuit 18' and capstan control circuit 11' are set to "1-hold speed" in accordance with the pre-format mode control signal SPD applied to the input terminal 34. The mode control signal SPD is a binary signal, indicating the normal-speed pre-formatting and normal recording-playback mode by its low level, or the "4-fold speed" pre-formatting mode by its high level, for example.

The following describes the time code generation circuit 22', control signal generation circuit 23', reference signal generation circuit 33, and capstan control circuit 11' operating in compliance with the D-2 digital VTR standard, as an example.

The time code generation circuit 22' generates a 80-bit time code at an interval of the video signal frame period in response to the reference signal REF-b (30 Hz in normal mode) provided by the reference signal generation circuit 33, with each bit of the time code corresponding to two time code clocks TCK whose frequency is set to 4.8 kHz (30 Hz×80×2) for the normal mode. The control signal generation circuit 23' generates a composite control signal consisting of a servo reference pulse CTL180, video frame pulse CTL30, and color frame pulse CTL15, as shown in FIG. 10.

Figure 10:
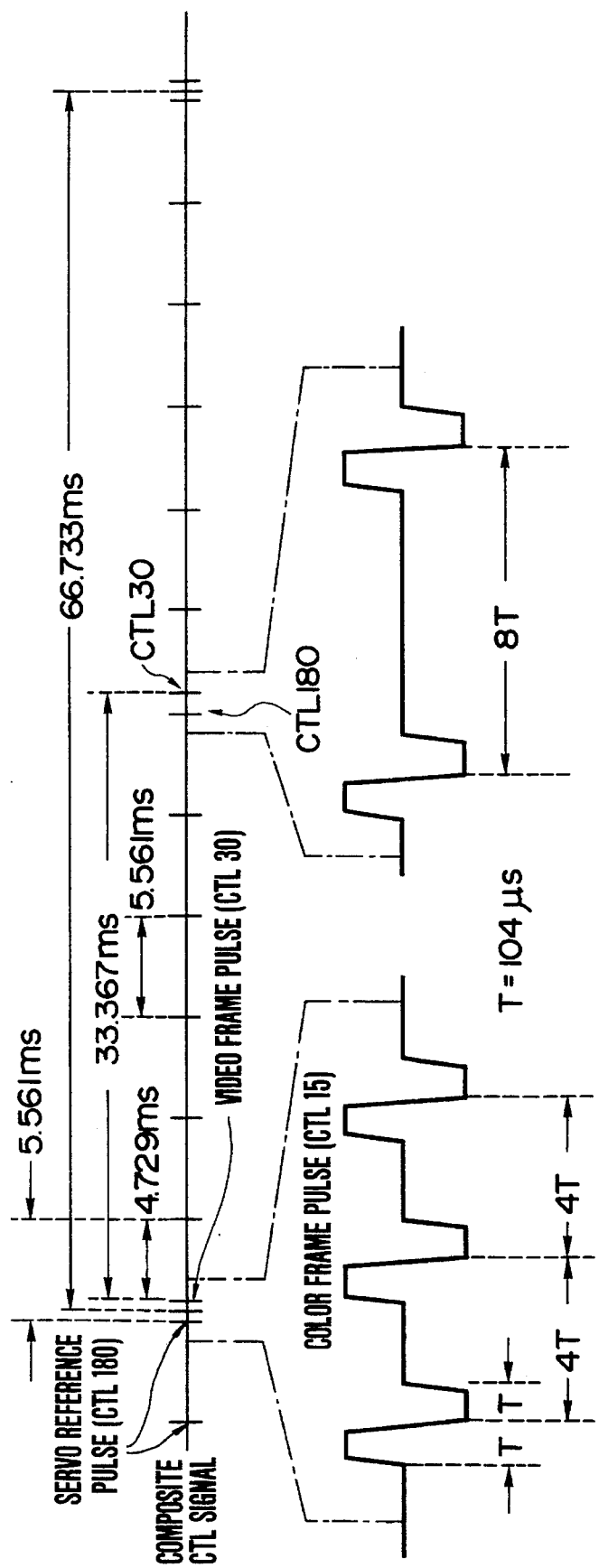
FIG. 10 is a timing chart showing the specifications of the control signal.

In FIG. 10, the servo reference pulse CTL180 has a period based on 180 Hz (six times the frame period), the video frame pulse CTL30 has a period based on 30 Hz (frame period), and the color frame pulse CTL15 has a period based on 15 Hz (color frame period). This composite control signal is generated in response to the reference signals REF-d and REF-c provided by the reference signal generation circuit 33 as results of count of the control signal clock CCK having a frequency of 7.1 MHz preferably. The reference signals REF-d and REF-c for the normal speed mode have frequencies of 180 Hz and 15 Hz, respectively.

Figure 11:
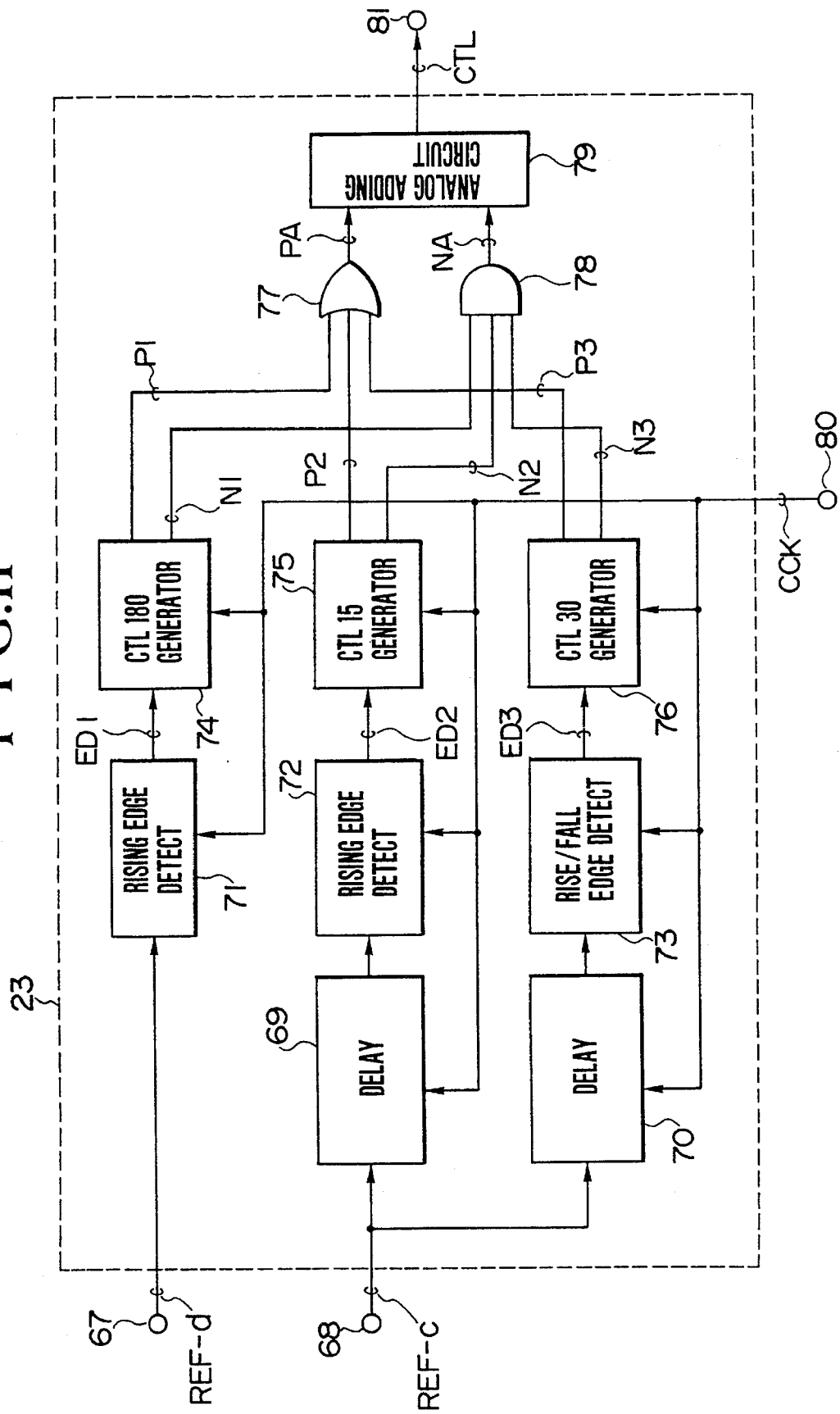
FIG. 11 is a block diagram of the control signal generation circuit.
Figure 12:
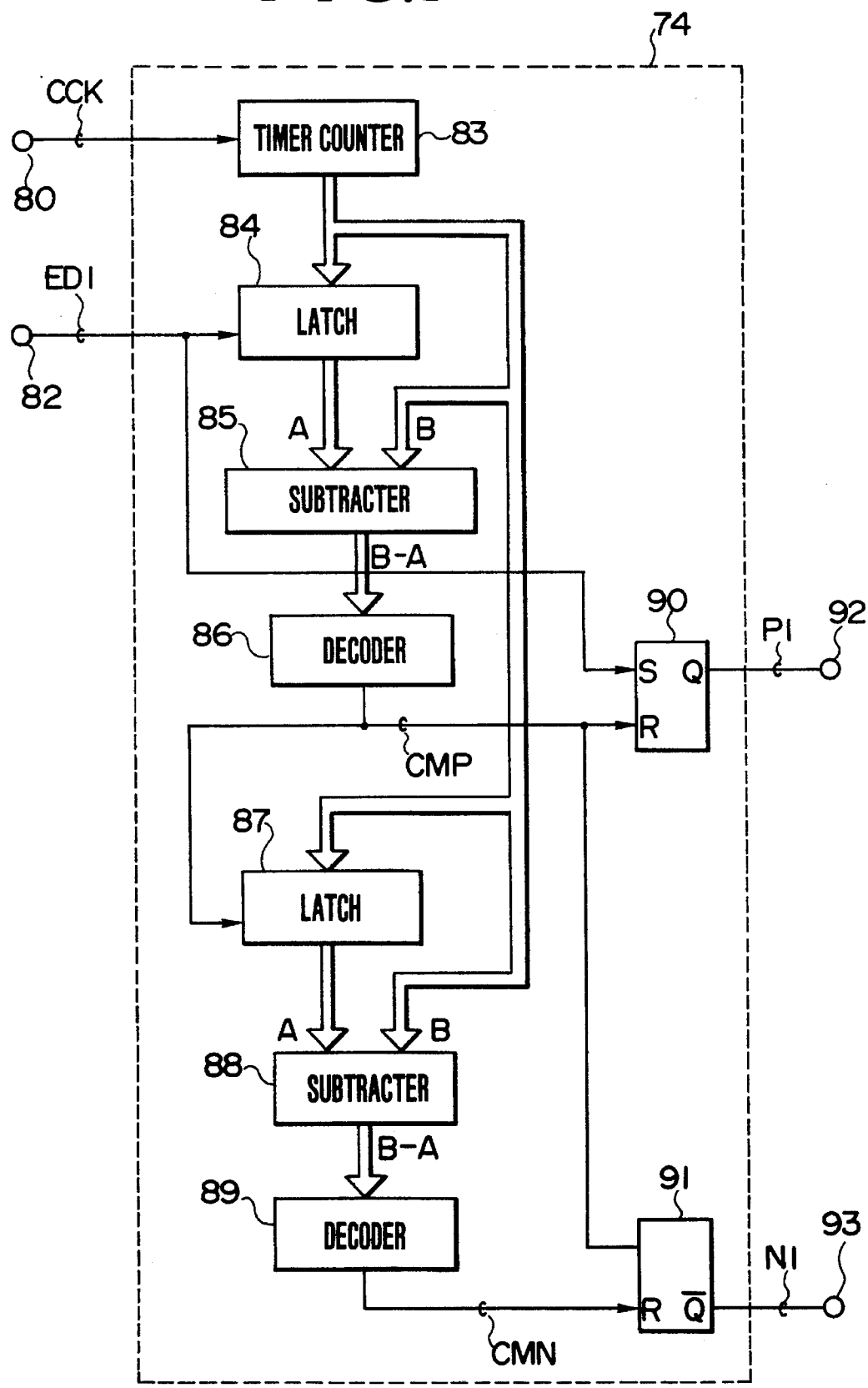
FIG. 12 is a block diagram of the control pulse generation circuit.

FIGS. 11 and 12 show the internal arrangement of the control signal generation circuit 23.

In FIG. 11, indicated by 67 and 68 are input terminals for the reference signals REF-d and REF-c, 69 and 70 are delay circuits, 71 and 72 are rising edge detection circuits, 73 is a rise/fall edge detection circuit, 74, 75 and 76 are circuits for generating the servo reference pulse CTL180, color frame pulse CTL15 and video frame pulse CTL30, respectively, 77 is an OR gate, 78 is an AND gate, 79 is an analog adding circuit, 80 is an input terminal for the control signal clock CCK, and 81 is an output terminal for the composite control signal CTL.

The reference signal REF-d (180 Hz in normal speed mode) applied to the input terminal 67 is differentiated by the rising edge detection circuit 71 in synchronism with the clock signal CCK received on the input terminal 80, and the resulting rising edge pulse ED1 is delivered to the servo reference pulse (CTL180) generation circuit 74, which is arranged as shown in FIG. 12 for example.

In FIG. 12, indicated by 80 is an input terminal for the clock CCK, 82 is an input terminal for the rising edge pulse ED1, 83 is a timer counter which counts the clock CCK, 84 and 87 are latch circuits, 85 and 88 are subtracters, 86 and 89 are decoders, 90 and 91 are R-S flip-flops, 92 is an output terminal for the positive pulse P1, and 93 is an output terminal for the negative pulse N1.

Figure 13:
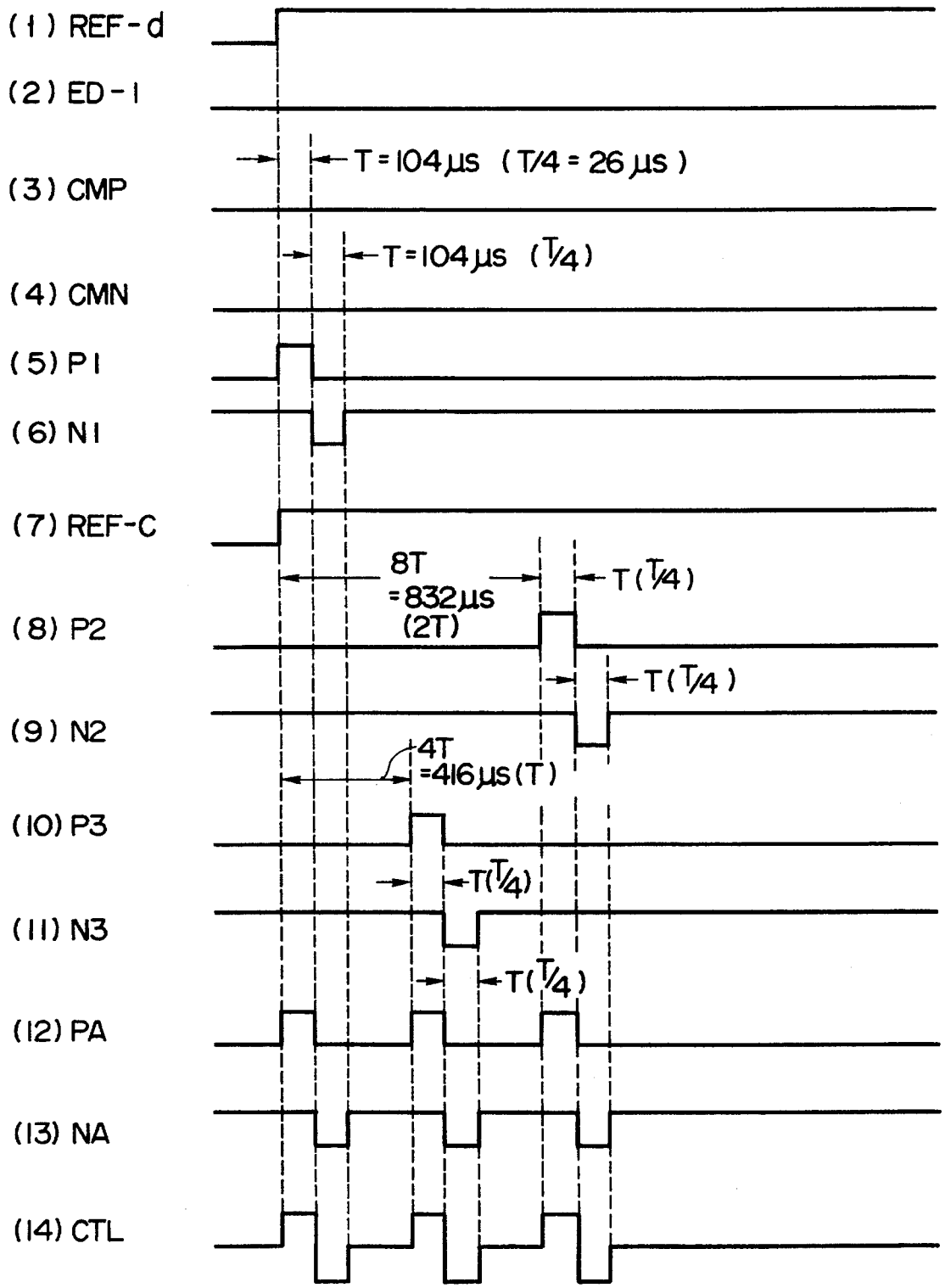
FIG. 13 is a timing chart showing the principal signals in the control signal generation circuit.

FIG. 13 shows the principal signals explained on FIGS. 11 and 12.

In FIG. 12, the timer counter 83 counts continuously the clock CCK applied to the input terminal 80, and delivers the count value to the latch circuit 84 and the input terminal B of the subtracter 85. The rising pulse ED1 applied to the input terminal 82 is delivered to the latch circuit 84 as a latch clock and also to the set terminal of the R-S flip-flop. The latch circuit 84 latches the count value of the timer counter 83 in response to the rising edge pulse ED1, and delivers it to the input terminal A of the subtracter 85. The subtracter 85 subtracts the latched data of the latch circuit 84 from the count value of the timer counter 83, and delivers the result to the decoder 86. The decoder 86 produces a decoded output CMP at the end of the period T (104 µs) in FIG. 10, and delivers it to the reset terminal of the R-S flip-flop 90, the set terminal of the R-S flip-flop 91, and the latch clock terminal of the latch circuit 87. The latch circuit 87, subtracter 88 and decoder 89 operate identically to the above-mentioned latch circuit 84, subtracter 85 and decoder 86 to produce a decoded output CMN which is the reset signal for the R-S flip-flop 91. The edge pulse ED1, decoded output CMP, decoded output CMN, and reference signal REF-d have their timing of generation as shown by (1)-(4) in FIG. 13. Accordingly, the positive pulse P1 which is the Q-output of the R-S flip-flop 90 and the negative pulse N1 which is the Q-output of the R-S flip-flop 91 are as shown by (5) and (6) in FIG. 13.

In FIG. 11, the reference signal REF-c (15 Hz in normal speed mode) applied to the input terminal 68 is delayed by 8T (104×8=382 µs) and 4T (104×4= 416 µs) in FIG. 10 by the delay circuits 69 and 70, and delivered to the rising edge detection circuit 72 and rise/fall edge detection circuit 73, respectively. The rising edge detection circuit 72 delivers the rising edge pulse ED2 derived from the reference signal REF-c delayed by 8T to the color frame pulse (CTL15) generation circuit 75, and the rise/fall edge detection circuit 73 delivers the rise/fall edge pulse ED3 derived from the reference pulse REF-c delayed by 4T to the video frame pulse (CTL30) generation circuit 76. The CTL15 generation circuit 75 and CTL30 generation circuit 76 are arranged identically to the CTL180 generation circuit 74 which has been explained on FIG. 12, and these circuits produce the positive pulses P2 and P3 shown by (8) and (10) in FIG. 13, and the negative pulses N2 and N3 shown by (9) and (11), and deliver these pulses to the OR gate 77 and AND gate 78, respectively. In response to these pulses, the OR gate 77 produces a positive pulse PA shown by (12) in FIG. 13 and the AND gate 78 produces a negative pulse NA shown by (13). These pulses PA and NA are added together by an analog adding circuit 79, which then produces a composite pulse CTL shown by (14) in FIG. 13.

Next, the operation of "4-fold speed" pre-formatting will be explained. In FIG. 9, the pre-format mode control signal SPD applied to the input terminal 34 goes high in the 4-fold pre-formatting mode so that the clock generation circuit 18' and capstan control circuit 11' are set to this mode. The clock generation circuit 18' produces 4-time frequencies for clocks except for the master clock MCK of the digital signal processor, i.e., the time code clock TCK, control signal clock CCK, and reference signal clock RCK. In response to the clock, the reference signal generation circuit 33 produces frequencies four times that of normal pre-formatting for reference signals except for the reference signal REF-a fed to the cylinder control circuit 10, i.e., the REF-b, REF-c and REF-d. Consequently, the time code generation circuit 22' produces time codes having a ¼ period of normal pre-formatting, and the control signal generation circuit 23' operates in the timing relationship shown in parentheses in FIG. 13 thereby to produce the control signal having a ¼ period of normal pre-formatting.

The capstan control circuit 11' responds to the mode control signal SPD to establish a target FG period for the speed control system, which is ¼ that of normal pre-formatting, and provides the phase control system with the reference signal REF-d having a 4-time frequency, so that the capstan motor 7 runs at the exact speed four times the normal pre-formatting to achieve the tape speed four times the normal pre-formatting.

Consequently, at pre-formatting, this embodiment makes the frequencies of time code and control signal four times those at normal pre-formatting, whereby it is possible to reduce the pre-formatting time to ¼.

Figure 14:
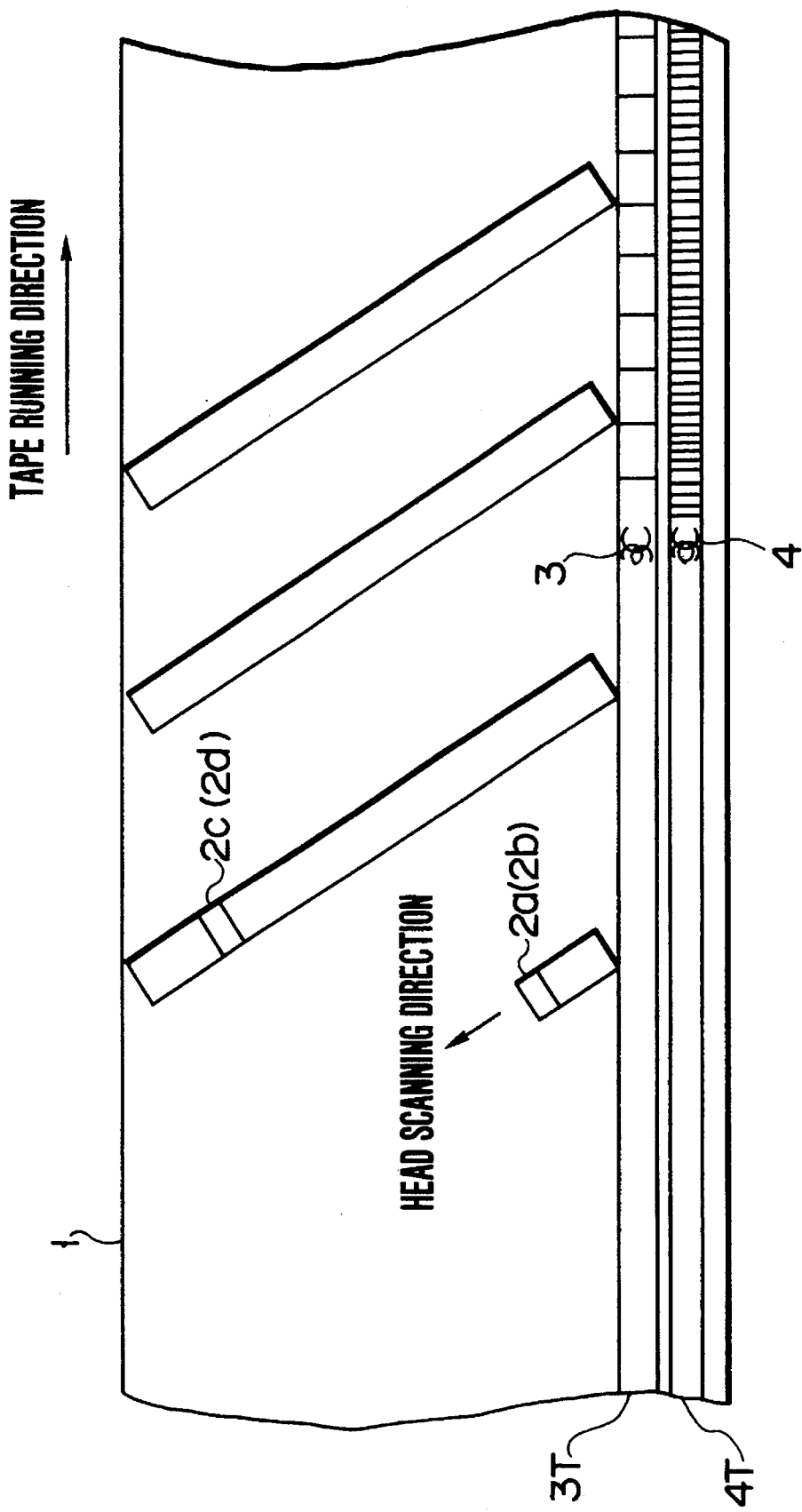
FIG. 14 is a diagram showing a tape pattern at the fast pre-formatting.

In this embodiment, the cylinder control system and digital signal processing system in the 4-fold pre-formatting mode operate at the same clock rates as in the normal pre-formatting mode, resulting in a tape scanning area of the tape check function about a quarter of the whole tape area as shown in FIG. 14. This means the tape evaluation for every fourth track, and it is sufficient as a tape check function against defects or the like on the tape. In case the tape evaluation is needed for every track, it can be accomplished by this embodiment by increasing the cylinder rotational speed four times the normal speed, e.g., increasing the frequency of REF-a by four times and decreasing the target cycle of the cylinder FG by a factor of four.

Although the foregoing embodiment is the case of fast pre-formatting of 4-fold speed, it can of course cope with any number of times of speed, such as 3-fold and 5-fold speeds.

FIG. 15 is a block diagram showing the circuit arrangement based on the fifth embodiment of this invention. This embodiment is intended to accomplish the fast pre-formatting without recording the tape check signal through the provision of the switch 19 shown in FIG. 1 for the information recording-playback apparatus capable of 4-fold speed pre-formatting of FIG. 9. The arrangement and operation of this embodiment are apparent from the foregoing explanation, and they will not be repeated.

Although in the embodiment of FIGS. 9 and 10 both of the control signal and time code are recorded for pre-formatting, the present invention is applicable also to the case of recording only one of these signals.

According to this invention, as described above, when the tape evaluation is conducted, with the tape check signal being recorded at pre-formatting, and even if the tape check signal is left as it is at recording after the pre-formatting, the residual tape check signal is treated as error at playback, whereby the tape evaluation at pre-formatting can be done without any adverse influence on the picture quality and sound quality of the subsequent recording and playback. In addition, it is also possible to have pre-formatting without recording the tape check signal depending on the user's intention.

Moreover, pre-formatting inclusive of tape evaluation based on this invention is as fast as several times that of the normal pre-formatting, whereby the time expended for pre-formatting can be reduced to a fraction of the conventional time length, and the effectiveness for the enhancement of performance and operation ability is enormous.

We claim:

1. An information recording apparatus comprising:

means for recording first information on a first track on a tape which is formed by helical scanning of rotary heads;

means for recording second or third information on a second or third track on the tape which is formed by a fixed head in a longitudinal direction of the tape;

switching means for selecting between a first operating mode in which said first information and said second or third information are recorded, and a second operating mode in which said first information is not recorded and said second or third information is recorded; and means for multiplying by N said second or third information in a frequency domain thereof, N not being equal to zero, and means for multiplying by N a speed of the tape with respect to a normal recording tape speed, said apparatus operating in said first or second operating mode to transport the tape at the speed N times the normal recording tape speed thereby to record said second or third information which has been multiplied by N in the frequency domain.

2. An information recording-playback apparatus comprising:

means for recording first information on a first track on a tape which is formed by helical scanning of a first rotary head and reproducing said first information from the track with a second rotary head which follows said first rotary head;

means for recording second or third information on a second or third track on the tape which is formed by a fixed head in a longitudinal direction of the tape;

means for evaluating said reproduced first information to detect errors in said reproduced first information indicative of a condition of the tape;

switching means for selecting between a first operating mode in which said first information and said second or third information are recorded and said reproduced first information is evaluated by said evaluating means, and a second operating mode in which said first information is not recorded and said second or third information is recorded;

erasing means for erasing any information recorded on the tape with an erasure head;

wherein the first operating mode is an operating mode in which the first information and the second or third information are recorded on the tape after any information on the tape has been erased by the erasing means, and the second operating mode is an operating mode in which the first information is not recorded on the tape and the second or third information is recorded on the tape after any information on the tape has been erased by the erasing means; and wherein the first operating mode and the second operating mode are pre-formatting modes.

3. An information recording-playback apparatus according to claim 2, wherein said second information is time code data and said third information is a control signal.

4. An information recording-playback apparatus according to claim 2, wherein the first information is a tape check signal, the second information is time code data, and the third information is a control signal.

5. An information recording-playback apparatus comprising:

means for recording digital information on a first track on a tape which is formed by helical scanning of a first rotary head;

means for recording second or third information on a second or third track on the tape which is formed by a fixed head in a longitudinal direction of the tape;

means for reproducing the digital information from the first track with a second rotary head which follows the first rotary head;

means for reproducing the second or third information from the second or third track;

means for detecting an error in the reproduced digital information;

means for generating first digital information;

means for coding the first digital information to produce fourth digital information which is substantially entirely detectable as an error by the error detecting means;

selecting means for selectively supplying one of the first digital information and the fourth digital information to the digital information recording means as the digital information; and means for controlling said apparatus to operate in a first operating mode in which said first digital information and said second or third information are recorded, a second operating mode in which at least said first digital information is reproduced, and a third operating mode in which said fourth digital information is recorded with the first rotary head and is reproduced with the second rotary head and said second or third information is recorded.

6. An information recording-playback apparatus according to claim 5, wherein said coding means includes means for logically inverting certain data in said first digital information.

7. An information recording-playback apparatus according to claim 5, wherein said first and fourth digital information each comprises a plurality of digital data blocks, with address information being appended thereto, said first digital information and fourth digital information having different address areas.

8. An information recording-playback apparatus according to claim 5, wherein said second information is time code data and said third information is a control signal.

9. An information recording apparatus comprising:

means for recording first information on a first track on a tape which is formed by helical scanning of rotary heads;

means for recording second or third information on a second or third track on the tape which is formed by a fixed head in a longitudinal direction of the tape;

means for multiplying by N at least said second or third information in a frequency domain thereof, N not being equal to zero; and means for multiplying by N a speed of the tape with respect to a normal recording tape speed, said apparatus operating to record said second or third information which has been multiplied by N in the frequency domain on the tape having a speed which has been multiplied by N.

10. An information recording apparatus according to claim 9, wherein said second information is time code data and said third information is a control signal.

11. An information recording-playback apparatus comprising:

means for recording first information on a first track on a tape which is formed by helical scanning of a first rotary head and reproducing said first information from the first track with a second rotary head which follows said first rotary head;

means for recording second or third information on a second or third track on the tape which is formed by a fixed head in a longitudinal direction of the tape;

means for multiplying by N a speed of the tape with respect to a normal recording tape speed, N not being equal to zero; and means for multiplying by N said second or third information in a frequency domain thereof, wherein said apparatus operates to record said first information with the first rotary head on the tape having a speed which has been multiplied by N, to reproduce said first information with the second rotary head from the tape having a speed which has been multiplied by N, and to record said second or third information which has been multiplied by N in the frequency domain on the tape having a speed which has been multiplied by N.

12. An information recording-playback apparatus according to claim 11, wherein said second information is time code data and said third information is a control signal.

13. An information recording-playback apparatus for recording and reproducing information on a magnetic tape comprising:

a rotary head assembly including at least a recording head and a playback head;

means for rotating said rotary head assembly under control such that said playback head follows said recording head;

means for transporting the tape under control;

at least one fixed head;

recording process means coupled with said rotary head assembly receiving one of first information in a normal recording/playback mode and tape evaluation information in a pre-formatting mode for performing a first digital signal processing on the received information and recording said processed information with said recording head on a first track on the tape which is formed by helical scanning of said rotary head assembly;

playback process means coupled with said rotary head assembly for reproducing said recorded information with said playback head from said first track and performing a second digital signal processing which is substantially a reverse process of said first digital signal processing on the reproduced information to reproduce said first information in the normal recording/playback mode and said tape evaluation information in the pre-formatting mode;

generation means coupled with said fixed head for generating second information and recording said second information on a second track on the tape formed by said fixed head in a longitudinal direction of the tape;

means coupled with said fixed head for reproducing said second information from said second track; and switching means for selecting between a first pre-formatting mode in which said tape evaluation information is recorded on said first track by said recording head and is subsequently reproduced by said playback head which follows said recording head and said second information is recorded on said second track by said fixed head, and a second pre-formatting mode in which said tape evaluation information is prevented from being recorded on said first track by said recording and and said second information is recorded on said second track by said fixed head.

14. An information recording-playback apparatus according to claim 13, wherein said second information includes one of control information for controlling the tape transporting means and time code information.

15. An information recording-playback apparatus according to claim 13 further comprising:

another fixed head;

generation means coupled with said another fixed head for generating third information to be recorded on a third track formed by said another fixed head in the longitudinal direction of the tape; and means coupled with said another fixed head for reproducing said third information from said third track, wherein said apparatus operates to record said third information in said first and second pre-formatting modes.

16. An information recording-playback apparatus according to claim 15, wherein said second information includes control information for controlling the tape transporting means and said third information includes time code information.

17. An information recording-playback apparatus according to claim 13, wherein said first information includes at least video information.

18. An information recording-playback apparatus according to claim 13, wherein said first digital signal processing preformed by said recording process means includes appending an error correction code to said first information, wherein said second digital signal processing performed by said playback process means includes performing an error detecting and correcting process of a predetermined capability on said processed information reproduced from said first track, and wherein said apparatus further comprises means connected with said recording process means and said playback process means for modifying said first digital signal processing and said second digital signal in said first pre-formatting mode such that when said reproduced information is said tape evaluation information, said reproduced tape evaluation information is substantially entirely detected as an uncorrectable error when said playback process means performs said second digital processing.

19. An information recording-playback apparatus according to claim 18, wherein said second digital signal processing is capable of correcting an error up to N bytes among a block of data of said first information, and wherein said modifying means comprises means for logically inverting data of N+1 bytes or more among data of said tape evaluation information, N not being equal to zero.

20. An information recording-playback apparatus according to claim 18, wherein said recording process means comprises means for appending predetermined addresses to data blocks of said first information, said playback process means comprises means for detecting said appended addresses, said modification means comprises means for appending addresses, which are different from said predetermined addresses, to data blocks of said tape evaluation information, and said second digital signal processing includes a process which predicates error in response to the detection of an address different from said predetermined addresses.

21. An information recording-playback apparatus according to claim 13 further comprising recording speed control means connected with said tape transporting means and said generation means for, in at least one of said first and second pre-formatting modes, multiplying by M a speed of the tape with respect to a normal recording tape speed and multiplying by M said second information in a frequency domain thereof, M not being equal to zero.

22. An information recording-playback apparatus for recording and reproducing information on a magnetic tape comprising:

a rotary head assembly including at least a recording head and a playback head;

means for rotating said rotary head assembly under control such that said playback head follows said recording head;

means for transporting the tape under control;

recording process means coupled with said rotary head assembly receiving one of information to be recorded on the tape in a normal recording/playback mode and tape evaluation information in a pre-formatting mode for performing a first digital signal processing on said received information including appending an error correction code to the received information and recording said processed information with said recording head on an inclined track on the tape which is formed by helical scanning of said rotary head assembly;

playback process means coupled with said rotary head assembly for reproducing said recorded information with said playback head from said inclined track and performing a second digital signal processing, which is substantially a reverse process of said first digital signal processing, on said reproduced information including performing an error detection and correction process of a predetermined capability on said reproduced information to reproduce said information to be recorded in the normal recording/playback mode and the tape evaluation information in the pre-formatting mode; and means connected with said recording process means and said playback process means for modifying said first digital signal processing and said second digital signal processing such that when said reproduced information is said tape evaluation information, said reproduced tape evaluation information is substantially entirely detected as an uncorrectable error when said second digital process means performs said second digital processing.

23. An information recording-playback apparatus according to claim 22, wherein said second digital signal processing is capable of detecting and correcting an error up to N bytes among a block of data of said information to be recorded, and wherein said modifying means comprises means for logically inverting data of N+1 bytes or more among data of said tape evaluation information.

24. An information recording-playback apparatus according to claim 22, wherein said recording process means comprises means for appending predetermined addresses to data blocks of said information to be recorded, said playback process means comprises means for detecting said appended addresses, said modification means comprises means for appending addresses, which are different from said predetermined addresses, to data blocks of said tape evaluation information, and said second digital signal processing includes a process which predicates error in response to the detection of an address different from said predetermined addresses.

25. An information recording-playback apparatus according to claim 22, wherein said information to be recorded includes at least video information.

26. An information recording-playback apparatus according to claim 22 further comprising means connected with said playback process means for displaying a detected error.

27. An information recording-playback apparatus for recording and reproducing information on a magnetic tape comprising:

a rotary head assembly including at least a recording head and a playback head;

means for rotating said rotary head assembly under control such that said playback head follows said recording head;

means for transporting the tape under control;

at least one fixed head;

recording process means coupled with said rotary head assembly receiving one of first information in a normal recording/playback mode and tape evaluation information in a pre-formatting mode for performing a first digital signal processing on the received information and recording said processed information with said recording head on a first track on the tape which is formed by helical scanning of said rotary head assembly;

playback process means coupled with said rotary head assembly for reproducing said recorded information with said playback head from said first track and performing a second digital signal processing which is substantially a reverse process of said first digital signal processing on the reproduced information to reproduce said first information in the normal recording/playback mode and said tape evaluation information in the pre-formatting mode;

generation means coupled with said fixed head for generating second information and recording said second information on a second track on the tape formed by said fixed head in a longitudinal direction of the tape;

means coupled with said fixed head for reproducing said second information from said second track; and recording speed control means connected with said tape transporting means and said generation means for multiplying by M a speed of the tape with respect to a normal recording tape speed and multiplying by M said second information in a frequency domain thereof in a first pre-formatting mode in which said first information and said tape evaluation information are not recorded.

28. An information recording-playback apparatus according to claim 27, further comprising switching means for selecting between said first pre-formatting mode or a second pre-formatting mode in which said second information and said tape evaluation information are recorded and said first information is not recorded.

29. An information recording-playback apparatus according to claim 27, wherein said tape transporting means comprises another generation means for generating third information for tape transport control, and another fixed head connected with said another generation means to record said third information on a third track which is formed in the longitudinal direction of the tape, and wherein said recording speed control means comprises means for multiplying by M said third information in a frequency domain thereof in said first pre-formatting modes.

30. An information recording-playback apparatus according to claim 28, wherein said recording speed control means comprises means connected with said rotating means for rotating said rotary head assembly at a speed M times a normal rotational speed in said first and second pre-formatting mode.

31. An information recording-playback apparatus according to claim 27, wherein said second information includes one of tape transport control data and time code data.

32. An information recording-playback apparatus according to claim 27, wherein said first information includes at least video information.

33. An information recording apparatus comprising:

- means for recording first information on a first track on a tape which is formed by helical scanning of rotary heads;
- means for recording second of third information on a second or third track on the tape which is formed by a fixed head in a longitudinal direction of the tape;
- switching means for selecting between a first operating mode in which said first information and said second or third information are recorded, and a second operating mode in which said first information is not recorded and said second or third information is recorded; and
- means for multiplying by N said second or third information in a frequency domain thereof, N not being equal to zero, and means for multiplying by N a speed of the tape with respect to a normal recording tape speed, said apparatus operating in said first or second operating mode to transport the tape at the speed N times the normal recording tape speed thereby to record said second or third information which has been multiplied by N in the frequency domain.

* * * * *